United States Patent Office 3,228,823
Patented Jan. 11, 1966

3,228,823
POLYVINYL FLUORIDE FILM SURFACED SUBSTRATES AND PROCESS OF MAKING SAME
Hugo Ralph Usala, Tonawanda, and Leon E. Wolinski, Buffalo, N.Y., assignors to E. I. du Pont de Nemours and Company, Wilmington, Del., a corporation of Delaware
No Drawing. Filed Aug. 20, 1962, Ser. No. 218,102
32 Claims. (Cl. 161—186)

This invention relates to laminating adhesives and laminates prepared therewith. More particularly this invention relates to an amino ester modified vinyl polymer-aromatic epoxy resin adhesive for laminating polyvinyl fluoride film to various substrates.

Polyvinyl fluoride is noted for its attractive properties, and in film form, possesses an unusual combination of excellent resistance to outdoor weathering exposures, a high degree of physical toughness, chemical inertness, abrasion resistance, resistance to soiling and the action of solvent as well as an amazing retention of these properties at both low and elevated temperatures. While the above combination of properties strongly suggests many areas of use for polyvinyl fluoride in the form of self-supporting films, a major effort is currently being directed toward the employment of both pigmented and unpigmented polyvinyl fluoride films as the outer layer of a wide variety of laminar structures destined chiefly for outdoor use wherein the polyvinyl fluoride films serve to upgrade less functional substrates, imparting to the final structure a degree of utility (both aesthetic and functional) not to be found solely in either film or substrate.

The outstanding combination of properties exhibited by polyvinyl fluoride films strongly suggests their use as the outer member of laminar structures to be employed as "prefinished" building siding and roofing in domestic, commerical and industrial installations.

Substrates suitable for combining with polyvinyl fluoride films include plywood, grainless hardboards, asbestos-cement boards and asphalt-impregnated cellulosic boards as well as metal substrates such as aluminum, cold rolled steel, galvanized and aluminized steels. To achieve the fullest exploitation of the inherent weatherability characteristics of polyvinyl fluoride films, it is essential that any adhesive employed in such laminations endure at least as long as the polyvinyl fluoride films themselves. Prime requisites of such an adhesive include a high degree of hydrolytic stability, a high cohesive strength and the ability of adhering strongly to both the substrate and the polyvinyl fluoride film. For economic reasons, it is also highly desirable that such an adhesive be operable in continuous or semi-continuous laminating operations in which a high degree of tackiness, i.e., adhesion in the uncured state, is advantageous.

Epoxy resin adhesives exhibit the requisite degree of hydrolytic stability and have been successfully employed in batch press-type laminating operations with polyvinyl fluoride films. However, in the uncured state, known epoxy adhesives do not exhibit the degree of tackiness and resistance to peel needed to prevent skewing of the substrate or wrinkling of the film passing through a continuously operated laminator. A wide variety of adhesives exhibiting a high degree of tackiness are available, for example acrylic adhesives and those based on either synthetic or natural rubber. However, none of these exhibit both adequate adhesive strength and the stability essential for the production of a polyvinyl fluoride film laminate having satisfactory weathering properties.

It is further desired that the adhesive system employed in the preparation of polyvinyl fluoride film laminates permits combining and rapid curing at a low temperature, i.e., below 150° F., to prevent the deformation and/or embrittlement which excessive heating can produce in those substrates containing a volatile component, for example, water in the case of plywood, grainless hardboards, asbestos-cement boards and asphalt-impregnated cellulosic boards.

It is, therefore, an object of this invention to provide improved adhesives and laminates prepared therewith.

It is a further object of this invention to provide an amino ester modified vinyl polymer-aromatic epoxy resin adhesive for laminating polyvinyl fluoride film to various substrates.

Another object of this invention is to provide adhesives, having high tackiness and which are readily curable at low temperatures, which are suitable for use in a continuous or semi-continuous process for laminating polyvinyl fluoride film laminates in which the adhesive bonding the polyvinyl fluoride film to the substrate retains its adhesive strength after prolonged exposure to abnormal environmental conditions, such as temperature, humidity, electromagnetic irradiation, etc. These and other objects of this invention will be apparent hereinafter.

These and other objects of this invention are accomplished by providing an adhesive composition comprising: (a) an organic solvent solution of a vinyl polymer having attached to the carbon-carbon chain monovalent radicals of the formula:

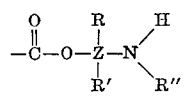

wherein:

Z is an aliphatic hydrocarbon radical of 2 to 3 carbon atoms; R is selected from the group consisting of hydrogen and alkyl radicals of from 1 to 8 carbon atoms; R' is selected from the group consisting of hydrogen, hydroxyl radicals and alkyl radicals of from 1 to 8 carbon atoms; and R" is selected from the group consisting of hydrogen, non-tertiary alkyl radicals of from 1 to 8 carbon atoms and omega-hydroxy substituted non-tertiary alkyl radicals of from 1 to 8 carbon atoms; the amino nitrogen content of said vinyl polymer being at least 0.01%, preferably 0.1 to 8.0% based on the weight of the vinyl polymer; and (b) a polyglycidyl ether of a dihydric phenolic compound having an epoxide equivalent of from 100 to 3000, preferably from 100–1000; wherein components (a) and (b) are present in a ratio by weight of from 1:99 to 99:1, preferably 97:3 to 25:75.

Laminates of this invention comprise a substrate, a preformed layer of polyvinyl fluoride film at least one surface of which has been chemically activated and between said substrate and said activated surface, an intermediate layer of the adhesive polymer of this invention.

By the term "epoxide equivalent" of an epoxy resin is meant the weight in grams of the resin containing one gram-equivalent of epoxide.

The preferred adhesive compositions of this invention are volatile organic solvent solutions of a polymer comprising: (A) an acrylic ester resin containing 0.1 to 8.0% amino nitrogen due to the presence of amino groups, having at least one hydrogen atom, attached directly to the ester radical, and (B) a diphenlyolpropane diglycidyl ether having an epoxide equivalent of from 100 to 1000, and (C) an amine curing agent; wherein the acrylic ester resin and diglycidyl ether are present in a ratio of from 97:3 to 25:75, the amine curing agent is present in an amount in the range of 0.5 to 30%, preferably about 2.5 to 15%, based on the combined weight of the acrylic ester resin and the diglycidyl ether, and the total weight of the ingredients, A, B and C, dissolved in the solvent make up 20 to 60% of the weight of the solution.

To be satisfactory for use in the adhesive mixture of this invention, both the aminoester modified vinyl polymer and the aromatic epoxy resin must be at least 5% soluble in a common organic solvent, or solvent mixtures, having a boiling point of less than about 175° C. Preferably, these two essential ingredients of the adhesive mixture should each have a solubility of 10%, or greater, in a common organic solvent, or solvent mixture, having a boiling point of less than 150° C. In general, aminoester modified vinyl polymers having molecular weights in the range of 3,000 to 1,000,000 have satisfactory solubilities and provide the high degree of adhesion desired when employed in the adhesive mixture of the invention. On the other hand, aminoester modified vinyl polymers of very high molecular weight, i.e., above about 1,000,000, have inadequate solubilities, while the low molecular weight vinyl polymers have low tensile strength and adhesive power, even when cured with an epoxy resin or an organic diisocynate. The aminoester polymers can also be blended to improve molecular weight or other properties. The molecular weight of the aromatic epoxy resin is not a critical factor affecting the bonding power of the adhesive of this invention, and in general, an epoxy resin having a suitable expoxide equivalent will also have satisfactory solubility.

A particularly preferred variety of acrylic resins for use in the adhesive mixture of this invention are those containing 80–97% of one, or a mixture of two or more, of the acrylate or methacrylate esters derived from the lower aliphatic alcohols having 1–8 carbons atoms and containing, in addition, a sufficient proportion of a methacrylate ester, having one of the following primary-amino-substituted ester radicals, to provide the desired quantity of amino nitrogen:

(1)         $-CH_2-CH_2-NH_2$ (2)         $-CH_2-\underset{\underset{CH_3}{|}}{CH}-NH_2$ (3)         $-\underset{\underset{CH_3}{|}}{CH}-CH_2-NH_2$ (4)         $-CH_2-\underset{\underset{OH}{|}}{CH}-CH_2-NH_2$ (5)         $-CH_2-\underset{\underset{NH_2}{|}}{CH}-CH_2-OH$ The preferred general procedure for preparing the aminoester modified vinyl polymers of this invention is to first prepare a vinyl polymer, of essentially the desired final structure, containing no amino groups, but instead, having suitable reactive groups, then react the preformed vinyl polymer with a reagent which converts a portion, or all, of the reactive groups into aminoester groups. In carrying out this procedure, it is generally preferred that the ethylenically unsaturated copolymerizable monomers used to prepare the initial vinyl polymer be combined in a suitable solvent in the presence of a polymerization catalyst and the polymerization reaction be performed at a conveniently controllable elevated temperature, for example at reflux at a constant pressure, until polymerization is essentially complete; the reagent for introducing the aminoester groups into the preformed vinyl polymer is then introduced into the polymer solution and the solution maintained at an elevated temperature until the reagent has been consumed. The resulting solution of aminoester modified vinyl polymer is satisfactory for combining directly with an aromatic epoxy resin to form an adhesive solution of this invention, since any small amounts of unreacted monomers or reaction by-products which may be present do not exert any undesirable effects, providing the critical features of the invention are properly controlled.

Suitable reactive groups which can be introduced into a vinyl polymer and later converted to aminoester groups include ester radicals containing oxirane groups

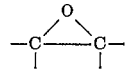

and carboxyl groups in the acid form

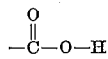

Preformed vinyl polymers containing ester radicals having oxirane groups can be converted to aminoester modified vinyl polymer by reacting the oxirane groups with ammonia or primary amines to introduce the desired amino groups, which bear at least one hydrogen. The general reaction is as follows:

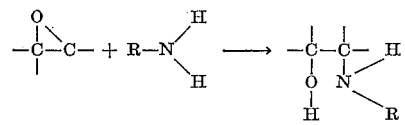

or

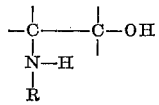

in which R is hydrogen or a non-tertiary alkyl radical of from 1–8 carbon atoms.

Vinyl polymers containing free carboxylic acid groups attached to the carbon-carbon chain can be converted to aminoester modified vinyl polymers by reacting the acid groups with an alkylene imine by the following general reaction. For example, the reaction with a 1, 2-alkylene imine proceeds by the following general formula:

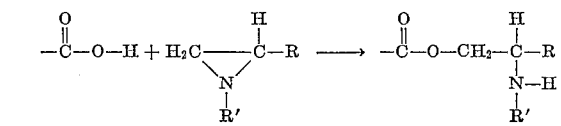

or

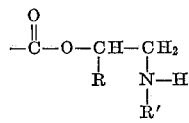

in which R is hydrogen or an alkyl group having 1 to 8 carbon atoms and R' is hydrogen, a non-tertiary alkyl radical of from 1 to 8 carbon atoms or omega-hydroxy substituted non-tertiary alkyl radicals of from 1 to 8 carbon atoms.

The preferred polymerizable monomers for use in introducing ester radicals with oxirane groups into vinyl polymer for subsequent conversion into aminoester groups are glycidyl acrylate and glycidyl methacrylate, since they can be copolymerized readily and the oxirane groups introduced thereby react readily with ammonia and amines. The preferred reagents for converting the oxirane ester groups into aminoester groups are ammonia and primary alkyl amines such as methylamine, ethyl amine, n-propyl amine and n-butyl amine; however, ammonia is particularly preferred because of its low cost.

The preferred polymerizable monomers for introducing carboxylic acid groups into a vinyl polymer for subsequent conversion to aminoester groups are monoethylenically unsaturated monocarboxylic acids, such as acrylic, methacrylic, crotonic and 3-butenoic acids, of which acrylic and methacrylic are particularly preferred. It should be clearly understood, however, that polymerizable unsaturated dicarboxylic acids such as itaconic, citraconic and maleic acids can be employed, or the anhydrides of such acids can be introduced into the vinyl polymer and later hydrolyzed to provide the necessary free carboxyl groups.

The alkylene imines for converting free carboxylic acid radicals of a vinyl polymer into aminoester groups are the 1,2-alkylene imines (aziridines), of which 1,2-propylene imine and ethylene imine are particularly preferred because of their availability and relatively low cost. If desired, the N-alkyl substituted or unsubstituted 1,3-alkylene imines (azetidines) can be used to provide the aminoester groups, since such imines are silimar to the 1,2-imines in their chemical reactivity and properties. Examples of these compounds include 2-methyl aziridine, 2-ethyl aziridine, 2-n-propyl aziridine, 2-isopropyl aziridine, 2-n-butyl aziridine, 2-isobutyl aziridine, 2-sec butyl aziridine, 2-(1-methyl butyl) aziridine, 2-(2-methyl butyl) aziridine, 2-(3-methyl butyl) aziridine, 2-n-pentyl aziridine, 2-(1-methylpentyl) aziridine, 2-(2-methyl pentyl) aziridine, 2-(3-methyl pentyl) aziridine, 2-(4-methyl pentyl) aziridine, 2-(3-ethyl pentyl) aziridine, 2-(2-isopropyl pentyl) aziridine, 2-n-hexyl aziridine, 2-n-heptyl aziridine, 2-n-octyl aziridine, 2, 3-dimethyl aziridine, 2, 3-di(2-methyl butyl) aziridine, 2-ethyl-3-n-hexyl arizidine, 2-n-octyl-3-propyl aziridine and their corresponding azetidines, for example; 2-methyl azetidine, 2-ethyl azetidine, 2-n-propyl azetidine, 2, 4-dimethyl azetidine, 2, 4-dioctyl azetidine and 2, 3-di(2-methyl butyl) azetidine.

Although the preferred aminoester modified vinyl polymers for use in the adhesive mixture of this invention are those composed predominantly of the lower alkyl acrylic or methacrylic esters, it should be pointed out that the composition of the bulk of the vinyl polymer is not critical. It should be emphasized, however, that to be suitable for use in this invention, the aminoester substituted vinyl polymer must be reasonably soluble in volatile organic solvents, contain at least 0.0% amino nitrogen, and the amino groups must have at least one hydrogen which is unhindered by bulky tertiary alkyl groups, such as tert. butyl, attached to the amino nitrogen. If the amino groups in the ester radical of a vinyl polymer contain no hydrogen atom, i.e., the groups are tertiary, or if the amino groups are hindered, then the vinyl polymer in combination with an epoxy resin will not yield an adhesive having the high adhesive strength at high humidity that is required of the adhesive of this invention. It is believed that the unhindered amino hydrogens of the vinyl polymers of this invention promote adhesion through hydrogen bonding to substrate materials with which they are brought into contact.

Copolymerizable monomers which can be used in preparing the aminoester substituted vinyl polymers of this invention include: methyl, ethyl, isobutyl, butyl, octyl, and 2-ethylhexyl acrylates and methacrylates; phenyl methacrylate, cyclohexylmethacrylate, p-cyclohexylphenyl methacrylate, methoxyethyl methacrylate, chloroethyl methacrylate, 2-nitro-2-phenylpropyl methacrylate and the corresponding esters of acrylic acid; methyl alpha-chloroacrylate, octyl alpha-chloroacrylate, methylisopropenyl ketone, acrylonitrile, methacrylonitrile, methyl vinyl ketone, vinyl chloride, vinyl acetate, vinyl propionate, vinyl chloroacteate, vinyl bromide, styrene, vinyl naphthalene, ethyl vinyl ether; butadiene, ethylene, propylene, 2-methyl-butene-1; acrylic, methacrylic, crotonic, maleic, fumaric, 3-butenoic, cinnamic, decadienedicic, and tetrapropenyl-succinic acids; N-vinyl phthalimide, N-vinyl succinimide, N-vinyl carbazole, isopropenyl acetate, methylene diethyl malonate, acrylamide, methacrylamine, or mono-alkyl substitution products thereof, phenyl vinyl ketone, diethyl fumarate, diethyl maleate, diethyl itaconate, dibutyl itaconate, vinyl pyridine, maleic anhydride, allyl glycidyl ether and other unsaturated aliphatic esters described in U.S. Patent 2,160,943.

Although it is preferred that the aminoester substituted vinyl polymer of this invention be prepared from preformed vinyl polymers, containing no amino groups but having reactive groups which are convertible into aminoester groups, it should be clearly understood that the vinyl polymers of this invention can also be prepared directly from monomer mixtures containing a monomer having the desired aminoester groups. Although it is preferred that the polymerization charge include one of the many vinyl polymerization catalysts known to the art, such as an azo compound or organic peroxy compound, for example, 2,2'-azodiisobutyronitrile and cumene hydroperoxide, the polymerization can be conducted without a catalyst if the length of time required to complete the reaction is of no great concern.

Although the preferred epoxy resins for use in this invention are the diphenylolpropane diglycidyl ethers which are obtained by reacting epichlorohydrin and 2,2-bis(4-hydroxyphenyl)propane at an elevated temperature in the presence of a strong base, such as sodium hydroxide, there are many other epoxy resins derived from other bisphenols and aliphatic epoxides which can be employed in the adhesive mixture of this invention, providing of course, that they have the required solubility and epoxide equivalent. Among the many phenolic compounds which can be utilized in the preparation of suitable epoxy resins are included the following:

4,4'-dihydroxybenzophenone
1,1'-bis(4-hydroxyphenyl)ethane
1,1'-bis(4-hydroxyphenyl)isobutane
2,2'-bis(4-hydroxyphenyl)butane
2,2'-bis(4-hydroxy-tert-butyl-phenyl)propane
Bis(2-hydroxy-naphthyl) methane
1,5-dihydroxy-naphthalene The epoxy component of the epoxy resin can be selected from compounds of the following groups:

1-chloro-2,3-epoxy butane
1-chloro-3,4-epoxy butane
2-chloro-3,4-epoxy butane
1-chloro-2-methyl-2,3,-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
1-chloro-2,3-epoxy octane
1-chloro-2-methyl-2,3-epoxy octane
1-chloro-2,3-epoxy decane Because of its low cost, high volatility, and good solvent power, the preferred solvent for the adhesive mixtures of this invention is a mixture of isopropyl alcohol and toluene in the ratio by weight of about 30 to 70; however, the nature of the solvent is not critical. Other suitable solvents which can be used, either individually or in mixtures, include the common commercially available alcohols, esters, ketones, aromatic hydrocarbons and halogenated hydrocarbons which have a boiling point of less than about 175° C. For example: methyl, ethyl, n-propyl, n-butyl alcohols; methyl, ethyl, propyl, and butyl acetates and propionates; acetone, methylethyl and diethyl ketones; benzene and the xylenes; and, ethylene chloride, chloroform and carbon tetrachloride.

The preferred amine curing agents for use in the adhesive mixture of this invention are the polyalkylenepolyamines, such as formed from ethylenediamine, diethylenetriamine, triethylenetetraamine, etc. However, the particular type and concentration of the polyamines are, in general, not critical. In fact, the aminoester modified vinyl polymer, contained in the adhesive mixtures of this invention, are themselves polyamines and function as curing agents, and in certain instances satisfactory curing rates are achieved without including another polyamine curing agent in the adhesive solution. In general, the amount of polyamine curing agent needed in the adhesive mixture will depend upon the drying temperature and the speed at which a particular lamination process is to be conducted. Other polyamine curing agents which are commercially available and can be used include: diethylaminopropylamine, metaphenylenediamine, diaminodiphenyl sulfone and methane diamine.

The polyvinyl fluoride layer used in the laminates of this invention is preferably in the form of a sheet or film. Such sheets and films of polyvinyl fluoride can be formed by known procedures such as those described in U.S. Patent No. 2,953,818 and in U.S. application Serial No. 801,441, filed March 24, 1959 by Robert S. Prengle and Robert L. Richards, Jr. One method of forming such sheets and films comprises feeding a mixture of latent solvent and polyvinyl fluoride to a heated extruder which is connected to a slotted casting hopper. A tough coalesced extrudate of polyvinyl fluoride is extruded continuously in the form of a sheet or film containing latent solvent. The sheet or film can be merely dried or, alternately, it can be heated and stretched in one or more directions while the solvent is volatilized therefrom. Sheets and films of polyvinyl fluoride also can be cast from dilute hot solutions of the polymer in latent solvent as described in U.S. Patent Nos. 2,419,008 and 2,419,010. If desired, various color and opacity effects can be achieved by incorporating pigments and fillers in the polyvinyl fluoride film during the manufacture thereof. Examples of pigments and fillers are metallic oxides, hydroxides, chromates, silicates, sulfides, sulfates and carbonates, organic dyes and flakes thereof and carbon blacks.

Each surface of the polyvinyl fluoride film which is to be adhered to another layer of the laminates of this invention is chemically activated, that is, is made surface receptive by forming in the surface layer thereof functional groups selected from one or more of the class consisting of hydroxyl, carboxyl, carbonyl, amino, amido and ethylenically unsaturated radicals. Means for activating the surface of the polyvinyl fluoride sheets and films are, for example, exposing the film to a gaseous Lewis acid such as boron trifluoride, aluminum trichloride or titanium tetrachloride or a liquid composition containing a coordination complex thereof, exposing the film to concentrated sulfuric acid, fuming sulfuric acid, sulfur trioxide or hot sodium hydroxide, exposing one surface of the sheet or film to an open flame while cooling the opposite surface and subjecting the film to a high-frequency, spark discharge.

In particular, for example, sheets or films of polyvinyl fluoride can be passed through a stainless steel lined treating chamber containing a gaseous mixture consisting of about from 1 to 90% by volume of boron trifluoride held at a temperature of about from 20 to 75° C. Dwell time in the chamber is usually on the order of 3 to 30 seconds. After the treatment with the boron trifluoride, the resulting film is either washed in ammonium hydroxide, washed in water, then air dried or merely washed in water and dried or alternately, heated for a brief period at a temperature of about from 100 to 150° C.

Another alternate procedure is to contact at least one surface of the polyvinyl fluoride layer with concentrated sulfuric acid, fuming sulfuric acid or sulfur trioxide, for example, for about from 2 seconds to 1 minute. The resulting product is washed in water and air dried. Preferably, the acid solution is held at a slightly elevated temperature, for example, about 25 to 95° C., the higher the temperature used, the less the contact time required.

Still another procedure is to immerse the polyvinyl fluoride sheet or film briefly in a boron trifluoride-ethyl etherate complex, wash the resulting product with water, acetone or ethyl ether, then air dry the final product. Alternately, since boron trifluoride coordinates or complexes with a wide variety of organic compounds, particularly amines and oxygen containing compounds such as ethers, alcohols, esters, acids and amides, complexes other than that with diethyl ether can be employed to chemically activate films of polyvinyl fluoride. For example, the complexes of boron trifluoride with dimethyl ether, methyl ethyl ether and phenol are particularly useful because they, like the diethyl ether complex, are liquids at room temperature. Slightly elevated temperatures are preferably employed to increase the rate of dissociation of the complex, thus shortening the immersion time necessary to effect a satisfactory degree of chemical activation.

A still further example of a method for activating the surface of the polyvinyl fluoride layer is to pass a sheet or film of polyvinyl fluoride at a rate of about 100 to 250 feet per minute over and in contact with a chilled metal drum while the surface not in contact with the drum passes through a flame, for example, a flame of a gas burner fueled with a 1:25, propane: air mixture.

A still further method for activating the surface of the polyvinyl fluoride layer is to subject the layer to high frequency spark discharge, preferably in an atmosphere of, for example, nitrogen, ammonia, boron trifluoride, oxygen or air. This can be done, for example, by passing a sheet or film of polyvinyl fluoride at a rate of about from 10 to 300 feet per minute over and in contact with a grounded metal drum while the surface away from the drum passes under and in close proximity to (for example, 0.010 to 0.025 inch) the rod or bar serving as an electrode and connected to a source of high-frequency alternating potential.

Examples of substrates which can be used in the laminates of this invention are metal substrates such as those of iron, steel, galvanized iron and steel, aluminum, aluminized steel, chromium, bronze, brass, lead, tin and nickel and various other alloys; glass and other vitreous substrates such as those of porcelain and china; impregnated substrates such as asphalt-impregnated cellulosics; hardboards such as "Masonite"; cement-asbestos boards; wood substrates such as those of birch, oak, fir, pine, hemlock, cedar, redwood, poplar, and ash; and polymeric substrates such as those of homopolymers of vinyl chloride and copolymers thereof with, for example, vinylidene chloride, vinyl acetate and fumaric, maleic and acrylic esters, those of regenerated cellulose, those of acrylic esters, those of urea-, melamine- or phenol-formaldehyde resins, and those of vinyl acetate. Composite substrates such as plywood or fabrics which are coated, impregnated or both, are particularly useful. As shown in the following examples, prior to lamination, metallic substrates can and usually are given a conventional passivation or corrosion-inhibiting treatment such as that used commercially to prepare substrates for painting. Substrates comprising metals, cementitious materials, wood and other cellulosic materials, sheets and films of vinyl chloride polymer and fabrics coated or coated and impregnated especially with vinyl chloride polymer are particularly preferred. Of course, a second layer of polyvinyl fluoride can also be used as a substrate.

Laminates of this invention are preferably prepared by continuously coating the aforementioned adhesive composition on one or both surfaces of each pair of surfaces to be adhered, drying the adhesive at a temperature of 25 to 35° C. to remove most of the solvent, then the surfaces to be adhered are brought together and the laminate pressed briefly at a pressure of 20 to 400 lbs./in.², and finally the laminate is stored for a period of 10 minutes to 4 days at a temperature of 20 to 100° C. to allow complete curing of the epoxy-aminoester vinyl polymer adhesive. For example, with the preferred adhesives, a web of aluminum foil and a web of polyvinyl fluoride film can be laminated continuously at a speed of about 125 ft./min. by applying a thin layer of the adhesive composition of this invention to the surface of the aluminum foil by the use of an applicator roll, drying the adhesive by exposing the aluminum foil briefly to a blast of hot air at about 35° C.; bringing the aluminum foil and polyvinyl fluoride film together and passing them through a pair of spring loaded nip rolls adjusted to apply 150 lbs./in.² pressure; then the resulting laminate is collected in the form of a roll and allowed to cure for 10 minutes to 1 day while in storage under normal atmospheric conditions.

It should be re-emphasized that two of the advantages of the adhesives of this invention are their high adhesive strength in the uncured state and their ease of curing under mild conditions of temperature. It is because of these desirable properties that these adhesives are well adapted for use in rapid continuous lamination processes in which prolonged exposure of the laminate to a high pressure and a high temperature cannot economically be provided. It should be clearly understood, however, that the adhesive of this invention can also be employed to considerable advantage in conventional batch-wise lamination processes in which the laminate is maintained under pressure in a press while the adhesive is partially or completely cured, since low curing temperatures can be used.

The laminates of this invention can consist of a layer of polyvinyl fluoride and a substrate adhered with a layer of the aforementioned adhesive. Also, the layer of polyvinyl fluoride and a substrate can be adhered with a layer of adhesive comprising blends of the adhesives of this invention or an adhesive of this invention blended with anti-oxidants, corrosion inhibitors, pigments, delustering agents, ultra violet light absorbers, other adhesives, cross linking agents and the like. For example, such polyamide resins like Versamid 125, a polyamide resin made by General Mills has been found useful as a combination plasticizer and curing agent in the adhesives of the present invention. Alternately, however, the laminates of this invention can, of course, comprise two or more layers of polyvinyl fluoride adhered with intermediate adhesive layers of this invention. Also, several alternate layers of the substrate and polyvinyl fluoride can be adhered with adhesive layers. Substrates comprising two or more layers, for example, plywood or coated fabrics can also be used.

The products of this invention have outstanding weather resistance and abrasion resistance and can be easily cleaned. In addition, they have excellent interlayer adhesion and also good resistance to delamination by failure at the intermediate adhesive layer even upon prolonged exposure to boiling water. Products of this invention comprising a formable substrate, such as a coated fabric or sheet metal, can be easily postformed into intricate shapes without delamination, even before the adhesive is completely cured. If desired, pigments, corrosion inhibitors or ultra violet light absorbers such as $TiO_2$, carbon black or basic zinc chromate can be incorporated into the adhesive layer to improve the weathering properties of the laminated structures or to improve their appearance to impart some other desirable property. Incorporating an antioxidant or ultra violet light absorber compound into the adhesive layer is especially desirable where clear polyvinyl fluoride film is laminated to plywood.

The products of this invention because of their excellent combination of weather resistance, abrasion resistance, solvent resistance, formability and excellent interlayer adhesion find ready use in many fields. In the construction field, both pigmented and clear polyvinyl fluoride films can be laminated to such substrates as cold rolled steel, galvanized and/or aluminized steel, aluminum, plywood, hardboards such as "Masonite," cement-asbestos boards and asphalt-impregnated cellulosic boards for use as siding and/or roofing for houses and other domestic structures as well as for commercial, industrial and institutional buildings. Laminations to metal and wooden substrates can be employed in the manufacture of outdoor signs, wall tile, wall and ceiling paneling, Venetian blinds, interior partitioning, awnings, ductwork, counter- and table-tops, store fronts, rain gutters and downspouts. Laminations to metal, particularly of pigmented polyvinyl fluoride films, can be postformed and employed to replace enameled and baked wall, ceiling, floor and side members of appliances such as refrigerators, freezers, air conditioners, dehumidifiers, hot-water heaters, washers and dryers, kitchen cupboards and cabinets. In the automotive field, laminations of clear, metallized and pigmented polyvinyl fluoride films to metal substrates can be employed variously as automobile door and side paneling, hard tops, moldings, interior and exterior trim, instrument paneling, wheel covers and hub caps, siding and tops for house trailers and truck and van bodies. Laminated to coated or uncoated fabrics or to polymeric films, polyvinyl fluoride films can serve as headliners, seat covers, floor mats and trunk liners. Other uses for the laminates of this invention include upholstery, floor coverings, lamp shades and book bindings.

The invention can be better understood by referring to the following examples.

EXAMPLE I

The following ingredients are charged into a reactor vessel, fitted with a stirrer, reflux condenser, thermometer and nitrogen inlet tube:

| | Parts |
|---|---|
| n-Butyl methacrylate | 60 |
| Methyl methacrylate | 30 |
| Methacrylic acid | 10 |
| Toluene | 105 |
| Isopropanol | 45 |

The mixture is stirred and heated at atmospheric pressure under a blanket of nitrogen at the reflux temperature of the solvent mixture (60° C.) for two hours, ten 0.1 part of alpha, alpha-azobisisobutyronitrile dissolved in 10 parts of a 70/30 mixture of toluene and isopropanol is added to the reaction mixture after 2 and 4 hours and the polymerization is continued for a total of 6 hours. The resulting polymer solution is then cooled to room temperature and diluted by the addition of 150 parts of a 70/30 toluene/isopropanol mixture. The resulting polymer has an inherent viscosity of 0.25 measure in a 0.5% solution of toluene, and a molecular weight of about 150,000.

To the cool polymer solution is added 8.6 parts of 1,2-propylenimine and the resulting mixture is stirred for ½ hour at room temperature. The temperature is subsequently increased to 60° C. and the mixture is stirred for 5 hours, then the resulting aminoester modified vinyl polymer solution is cooled to room temperature. The solution was found to contain 32% polymer solids. A sample of the polymer isolated from the solution is found to have 1.53% combined amino nitrogen.

A portion of the aminoester modified vinyl polymer solution is used to prepare an adhesive composition by combining the following ingredients:

| | Parts |
|---|---|
| Aminoester polymer solution | 100 |
| Epon 834[1] | 32 |
| Toluene | 100 |
| Tetraethylenepentamine | 2.5 |

[1] A liquid aromatic epoxy resin having an epoxide equivalent of 225-250 sold by the Shell Chemical Corp. of New York.

The upper surface of fir plywood panels, which have been cleaned of dirt and grease, are sprayed uniformly with about 2.0 mils thickness of the adhesive solution as they moved on a conveyor belt at 45 ft./min. toward a dryer and a nip-roll laminating assembly. The temperature of the dryer is maintained at 270° F., the retention time in the dryer is 10 seconds, the upper nip-roll is maintained at 150° F., while the nip-roll pressure is set at 20 p.s.i. After leaving the dryer, the panels pass between the nip-rolls which press onto the adhesive coated surface a 2 mil thick film of green pigmented polyvinyl fluoride that is fed between the nip-rolls from a supply roll under just sufficient tension to prevent wrinkling. Prior to the laminating operation, the surface of the film that is to be adhered to the plywood has been activated by being exposed briefly to a high frequency, high voltage electrical discharge. After sampling the freshly prepared laminate panels for "green adhesion" tests, they are stacked and aged at room temperature for 4 days to allow the adhesive to cure, then the cured panels are subjected to various tests. The test results are as follows:

"Green Adhesion:"
  Peel—900 gm./in.
  Tack—5400+gm./in.
Cured bond strength—CNS
Boiling water immersion test—100+ hrs.
Weather-O-Meter test—100+ hrs.
Fog chamber test—6+ wks.
Cyclic plywood test—OK.

The details of the test procedures are as follows:

*Peel* is the force in grams required to strip a one inch wide piece of the polyvinyl fluoride film loose from the substrate at an angle of 90° with respect to the laminate surface. The test is run by cutting the laminate into ½ inch wide sections, cutting the film loose from the substrate with a knife at one end and measuring the peel force with a Suter tester. To be suitable for low speed continuous laminations, the green adhesive should provide about 100 gm./in. peel, while for high speed processes, a peel of about 600 gm./in. is usually required. For batch wise lamination on the other hand, 50 gm./in. is usually sufficient.

*Tack* is the force in grams required to separate an area of one sq. inch of the polyvinyl fluoride film from a substrate at an angle of 180°. The test is conducted on ½ inch square pieces of the laminate which are placed between and adhered to two ½ inch wooden blocks with two-sided sticky pressure sensitive tape (Tape No. 666, produced by Minnesota Mining and Manufacturing Co.,). The force required to separate the two blocks because of failure of the uncured laminate adhesive is then measured with a Suter tester. To be suitable for use in continuous laminating processes, an adhesive should provide at least 300 gm./in.² in the uncured state.

*Cured bond strength* is a qualitative measure of the ease of removing polyvinyl fluoride film from a substrate after the adhesive has set. The test is conducted by cutting through the film layer of the laminate with a razor blade in a number of lines ⅛ inch apart, cutting the ends of the resulting section of film away from the substrate, then attempting to strip the individual sections of film away from the substrate with a pair of tweezers. If the ⅛ inch sections of film can be stripped from the substrate, the laminate (and adhesive) is unsatisfactory, which is designated as NO, while if the film sections cannot be stripped loose from the substrate, but break instead, the bonding is considered satisfactory and is designated CNS (cannot be stripped).

The *Boiling water immersion test* is an evaluation of the cured bond strength of a laminate after the laminate has been exposed continuously to boiling water for a period of time. To conduct the test, a series of samples are exposed to boiling water and from time to time a sample is removed and tested as described above and examined for blisters. The results are expressed as the length of time the sample retained CNS bonding and develops no blisters. A laminate must withstand at least 7 days exposure to boiling water to be satisfactory.

The *Weather-O-Meter* test is an accelerated weathering test in which a type HVDL-X Atlas Weather-O-Meter is employed. To conduct the test, the laminate sample is subjected alternately to an hour of water spray in darkness, to two hours of light from twin carbon arcs, to two hours of water spray in darkness and then to 6 more of light from the carbon arcs, then the cycle is repeated. The results are expressed as the length of time the samples withstand this test without blistering or loss of CNS bonding.

The *Fog chamber test* is a measure of the ability of a laminate to withstand a high temperature-high humidity environment. To conduct the test, laminate samples are placed in a closed chest and exposed to 100° F. and 100% R.H. and from time to time, a sample is removed and, examined for blisters and the cured bond strength determined. The results are expressed as the length of time the sample was exposed without developing blisters and/or loss of CNS bonding.

The *Cyclic plywood test* was conducted as described in ASTM D1037-56T.

EXAMPLES 2 TO 22

Using procedures similar to that described in Example 1, a series of aminoester modified vinyl polymers are prepared by polymerizing various monomer mixtures, each of which contains a copolymerizable carboxylic acid, to obtain vinyl polymers having free carboxyl groups, which are subsequently esterified by reacting the acid polymer with an imine. The resulting aminoester polymer solutions are then used to prepare adhesive compositions by combining them in various proportions with various epoxy resins and amine curing agents and diluting to 30% solids with a 70/30 toluene-isopropanol mixture.

Each of the adhesive compositions is used to prepare samples of laminates having two layers of polyvinyl fluoride film bonded together by the adhesive, then the laminate samples are subjected to tests to evaluate the usefulness of the adhesive composition in continuous lamination processes. The laminates are prepared as follows:

A biaxially oriented, 2 mil film of polyvinyl fluoride pigmented with titanium dioxide is made surface receptive by holding it for 10-20 seconds in an atmosphere containing a gaseous mixture of air and 1 to 12% by volume of boron trifluoride maintained at 25 to 35° C. Finally, the film is washed with 5% aqueous ammonium hydroxide, then washed with water and dried. To the activated surface of a piece of the film is applied a layer of adhesive composition about 2 mils thick, then the adhesive solvent is allowed to evaporate in air at room temperature for 20-30 minutes. Subsequently another similar size piece of the film is carefully smoothed and pressed firmly against the adhesive coated film to form the laminate. A portion of the freshly prepared laminate is immediately subjected to "green adhesion" tests, while the remainder is aged for 7 days at 25° C., then subjected to the boiling water immersion test.

The details of the preparation of the adhesive compositions and results of the test run on the laminate samples are given in the following table:

Table I
ADHESIVE PREPARATION

| Ex. | (A) Aminoester Modified Vinyl Polymer | | | | (B) Epoxy Resin | | (C) Curing Agent | Adhesive Composition A/B/C |
|---|---|---|---|---|---|---|---|---|
| | Composition of Preformed Polymer [1] Parts by wt. | Inherent Viscosity | Iminating Reagent | Percent N (Amino) | Type | Epoxide Equiv. | | |
| 2 | MMA/MAA, 89/11 | 0.32 | Ethylene imine | 1.7 | "Epon" 834 [2] | 225–250 | "Epon" U [3] | 50/50/15 |
| 3 | BMA/MMA/MAA, 55/35/10 | 0.35 | ----do---- | 1.6 | ----do.[2]---- | 225–250 | ----do.[3]---- | 50/50/15 |
| 4 | MMA/MAA, 98/2 | 0.33 | ----do---- | 0.32 | ----do.[2]---- | 225–250 | ----do.[3]---- | 50/50/15 |
| 5 | BMA/MMA/MAA, 75/15/10 | 0.36 | ----do---- | 1.6 | ----do.[2]---- | 225–250 | ----do.[3]---- | 50/50/15 |
| 6 | BMA/MMA/MAA, 85/5/10 | 0.38 | ----do---- | 1.6 | ----do.[2]---- | 225–250 | ----do.[3]---- | 50/50/15 |
| 7 | MAA/AN/S, 5/60/35 | 0.38 | ----do---- | 0.8 | ----do.[2]---- | 225–250 | ----do.[3]---- | 50/50/15 |
| 8 | BMA/MMA/MAA, 55/35/10 | 0.35 | 1,2-hexene imine | 1.1 | ----do.[2]---- | 225–250 | ----do.[3]---- | 50/50/15 |
| 9 | BMA/AA, 89/11 | 0.32 | 1,2-propylene imine | 1.3 | ----do.[2]---- | 225–250 | ----do.[3]---- | 50/50/15 |
| 10 | E/MAA, 82/18 | 1.8 | ----do---- | 2.6 | ----do.[2]---- | 225–250 | None | 80/20/0 |
| 11 | E/MAA, 82/18 | 1.9 | Ethylene imine | 2.7 | ----do.[2]---- | 225–250 | "Epon" U | 50/50/15 |
| 12 | B/MMA/MAA, 45/45/10 | 0.40 | 1,2-propylene imine | 1.5 | ----do.[2]---- | 225–250 | None | 84/16/0 |
| 13 | B/MMA/MAA, 45/45/10 | 0.40 | ----do---- | 1.5 | ----do.[2]---- | 225–250 | "Epon" U [3] | 50/50/15 |
| 14 | BMA/MMA/MAA, 55/35/10 | 0.35 | ----do---- | 1.1 | ----do.[2]---- | 225–250 | ----do.[3]---- | 1/99/29 |
| 15 | BMA/MMA/MAA, 55/35/10 | 0.35 | ----do---- | 1.1 | ----do.[2]---- | 225–250 | ----do.[3]---- | 99/1/0.5 |
| 16 | BMA/MMA/MAA, 55/35/10 | 0.35 | ----do---- | 1.1 | Diglycidyl ether of resorcinol. | 167 | ----do.[3]---- | 50/50/15 |
| 17 | BMA/MMA/MAA, 55/35/10 | 0.35 | ----do---- | 1.1 | "Epon" 1009 [2] | 3,000 | ----do.[3]---- | 50/50/3 |
| 18 | BMA/MMA/MAA, 55/35/10 | 0.35 | ----do---- | 1.1 | "Epon" 834 | 225–250 | Diethylene triamine. | 50/50/3 |
| 19 | BMA/MMA/MAA, 55/35/10 | 0.35 | ----do---- | 1.1 | ----do---- | 225–250 | Tetraethylene pentamine. | 50/50/4 |
| 20 | BA/BMA/MMA/MAA, 13.8/49/36.8/4.6 | 0.2 | ----do---- | 0.7 | ----do---- | 225–250 | None | 90/10/0 |
| 21 | BA/BMA/MMA/MAA, 14/49/36.8/0.21 | 0.38 | ----do---- | 0.016 | "Epon" 834 [2] | 225–250 | "Epon" U [3] | 50/50/15 |
| 22 | MMA/MAA, 30/70 | 0.32 | ----do---- | 7.8 | ----do.[2]---- | 225–250 | None | 50/50/ 0 |

[1] The monomers are abbreviated as follows:
MMA = methyl methacrylate.
MAA = methacrylic acid.
BMA = n-butyl methacrylate.
AN = acrylonitrile.
S = styrene.
AA = acrylic acid.
E = ethylene.
B = butadiene.

[2] "Epon" 834 and "Epon" 1009 are epoxy resins derived from Bisphenol A and epichlorohydrin and produced by Shell Chemical Corporation.

[3] "Epon" U is an addition product of diethylene triamine and the diglycidyl ether of Bisphenol A (epoxy eq. = 180–195) in the ratio of 2/1 produced by Shell Chemical Corporation.

Table Ia
TEST RESULTS

| Examples | "Green Adhesion" | | Boiling Water Immersion, Days |
|---|---|---|---|
| | Tack [1] (gm./in.[2]) | Peel (gm./in.) | |
| 2 | 4,500+ | 540 | 27+ |
| 3 | 4,500+ | 900 | 42+ |
| 4 | 4,300+ | 530 | 17 |
| 5 | 4,500+ | 560 | 42+ |
| 6 | 2,940 | 410 | 22 |
| 7 | 1,695 | 164 | 7 |
| 8 | 3,800 | 600 | 7+ |
| 9 | 4,180 | 670 | 7+ |
| 10 | | CNS | 7+ |
| 11 | 3,600 | 510 | 13+ |
| 12 | | CNS | 7+ |
| 13 | 4,140 | 580 | 7+ |
| 14 | | CNS | 7+ |
| 15 | 4,200 | 1,200 | 7+ |
| 16 | 4,600+ | 720 | 7+ |
| 17 | 4,100 | 600 | 7+ |
| 18 | 4,500+ | 620 | 7+ |
| 19 | 4,500+ | 580 | 7+ |
| 20 | | CNS | 7+ |
| 21 | 4,250 | 520 | 7+ |
| 22 | 4,100 | 480 | 7+ |

[1] The + value indicates that the tack value exceeds the strength of the two-side tape used to hold laminate sample in Suter tester.

EXAMPLE 23

The following materials are charged to a closed reaction vessel and heated under a nitrogen blanket for 6 hours at 92° C.:

| | Parts |
|---|---|
| Methyl methacrylate | 223.84 |
| Glycidyl methacrylate | 5.04 |
| Benzoyl peroxide | 1.81 |
| Toluene | 161.19 |
| Isopropanol | 69.08 |

The resulting polymer has an inherent viscosity of 0.25 measured in a 0.5% solution in methyl ethyl ketone and a molecular weight of about 81,000. After dilution with 80.7 parts of toluene and 226.5 parts of isopropanol the solution montains about 30% solids and has a viscosity of about 6.9 poises.

The above copolymer is charged to a closed reaction vessel, then anhydrous ammonia is charged thereto to a pressure of 45 pounds per square inch gauge. The reaction mixture is then held for 6 hours at about 80° C. Ammonia is stripped from the reaction mixture by reducing the pressure in the reactor at a rate of 10 millimeters of mercury per minute until a pressure therein is 100 millimeters of mercury absolute and then holding the reactor at that pressure and at a temperature of 40° C. for 5 hours. The resulting product, which has a viscosity of about 11.8 poises contains about 30% of a copolymer of 97.8% of methyl methacrylate and about 2.2% of glycidyl methacrylate which contains about 0.216% of combined amino nitrogen.

The polymer solution (A) is combined in various proportions with Epon 834 (B) and triethylenetetramine (C) to yield adhesive solutions, all of which are diluted to 30% solids by the addition of an appropriate amount of 70/30 toluene-isopropanol mixture. The adhesive solutions are then used in the preparation of a polyvinyl fluoride film laminate as described in Examples 2 to 22, and the laminates tested in the usual manner. The results are as follows:

| Sample | Adhesive Composition A/B/C | Tack (gm./in.²) | Peel (gm./in.) | Boiling Water Immersion (Days) |
|---|---|---|---|---|
| a | 100/0/0 | 0 | 0 | (¹) |
| b | 95/5/1.5 | 600 | 115 | 42 |
| c | 90/10/3 | 1,300 | 235 | 42 |
| d | 80/20/6 | 2,950 | 470 | 42 |
| e | 70/30/9 | 4,250 | 575 | 42 |
| f | 50/50/15 | 4,500 | 612 | 42 |
| g | 30/70/21 | 3,900 | 610 | 42 |
| h | 20/80/24 | 2,550 | 400 | 42 |
| i | 10/90/27 | 1,250 | 190 | 42 |
| j | 5/95/28.5 | 650 | 90 | 42 |
| k | 0/100/30 | 0 | 0 | 42 |

¹ 3 hrs.—failed.

A portion of the adhesive composition designated above as sample f is modified by the addition of 25% (based on adhesive solids) of basic zinc chromate, which serves the dual purpose of corrosion inhibitor and pigmenting agent in the preparation of colored polyvinyl fluoride-metal laminated for outdoor exposure. Calcium molybdate can also be used for this purpose.

The pigmented adhesive is employed in the continuous lamination of 27 mil galvanized steel sheeting, having a phosphatized surface, to clear, 2 mil polyvinyl fluoride film, having a surface activated by $BF_3$ treatment. After curing of the adhesive, the yellow laminate is found to withstand being sharply deformed without loss in bond strength; for example, it can be sharply bent or even creased without destroying the bond. The laminate is also exposed to the boiling water immersion test for 7 days without failure, and is subjected to 30 months outdoor exposure in Florida and Buffalo, New York, without loss of adhesive bonding. Substantially the same results are obtained with polyvinyl fluoride laminates made from aluminum sheeting or aluminized steel sheeting.

A portion of the adhesive solution designated above as sample f is modified by the incorporation of 30% (based on adhesive solids) of Thiokol LP-33, a liquid polysulfide polymer (known to be useful in epoxy adhesives for concrete), produced by the Thiokol Chemical Corp., of Trenton, New Jersey, and this modified adhesive is used in the continuous nip-roll lamination of polyvinyl fluoride film to flexboard (asbestos-cement board). Prior to the lamination process, the surface of the polyvinyl fluoride film is activated by treating it with a high frequency, high-voltage electrical discharge, while the flexboard is cleaned and made more receptive to the adhesive by being dipped for about 5 seconds in a solution containing 10% $ZnCl_2$ and 15% $H_3PO_4$, then rinsing with water and drying.

After the adhesive has cured, the flexboard-polyvinyl fluoride film laminate is tested for weatherability and the following results are obtained.

Boiling water immersion test _____ 24+ hours.
Fog chamber test _____ 6+ weeks.
Weather-O-Meter test _____ 1000+ hours.
Outdoor exposure in Florida and Buffalo __ 18+ months.

EXAMPLES 24 TO 38

Using procedures similar to that described in Example 23, a series of aminoester modified vinyl polymers is prepared by polymerizing various monomer mixtures, each of which contains a copolymerizable monomer having ester radicals with oxirane groups, which are subsequently reacted with either ammonia or primary amine to introduce the necessary amino groups into the polymer molecule. The resulting aminoester polymer solutions are then used to prepare adhesive compositions in accordance with this invention by combining them with suitable epoxy resins and polyamines in various proportions and diluting the resulting mixture to 10 to 50% solids with a volatile organic solvent.

Each of the adhesive compositions is then used in the lamination of polyvinyl fluoride films, having surfaces activated by a brief exposure to a propane gas flame, to aluminum panels, having surfaces treated in the conventional manner with an acid chromate bath to form a very thin deposit of aluminum chromate. The resulting laminate samples are then tested before and after aging to evaluate the usefulness of the adhesives in the continuous production of weather resistant laminates. The details of the preparation of the adhesives and the test results on the laminates are given in the following table:

Table II

ADHESIVE PREPARATION

| Examples | (A) Aminoester Modified Vinyl Polymer | | | | (B) Epoxy Resin | | (C) Curing Agent | Adhesive Composition A/B/C |
|---|---|---|---|---|---|---|---|---|
| | Composition of Preformed Polymer ¹ Parts by wt. | Inherent Viscosity | Aminating Reagent | Percent N (Amino) | Type | Epoxide Equiv. | | |
| 24 | BMA/MMA/GMA, 67/30/3.5 | 0.5 | NH₃ | 0.3 | "Epon" 834 ² | 225-250 | "Epon" U ³ | 50/50/15 |
| 25 | MMA/HMA/GMA, 40/57/3 | 0.42 | NH₃ | 0.3 | do ² | 225-250 | do ³ | 50/50/15 |
| 26 | EMA/GMA, 97/3 | 0.38 | NH₃ | 0.29 | do ² | 225-250 | do ³ | 50/50/15 |
| 27 | t-BA/GMA, 97/3 | 0.37 | NH₃ | 0.29 | do ² | 225-250 | do ³ | 50/50/15 |
| 28 | S/EA/AN/GMA, 55/34/8/3 | 0.40 | NH₃ | 0.50 | do ² | 225-250 | do ³ | 50/50/15 |
| 29 | MMA/BMA/GMA, 32.5/64.0/3.5 | 0.31 | Ethanolamine | 0.25 | do ² | 225-250 | do ³ | 50/50/15 |
| 30 | MMA/BMA/GMA, 30.8/61.5/7.7 | 0.32 | Methylamine | 0.70 | do ² | 225-250 | do ³ | 50/50/15 |
| 31 | MMA/BMA/GMA, 40/57/3 | 0.35 | NH₃ | 0.3 | do ² | 225-250 | do ³ | 50/50/15 |
| 32 | MMA/BMA/GMA, 40/57/3 | 0.35 | NH₃ | 0.3 | do ² | 225-250 | do ³ | 25/75/22.5 |
| 33 | MMA/BMA/GMA, 40/57/3 | 0.35 | NH₃ | 0.3 | do ² | 225-250 | do ³ | 75/25/7.5 |
| 34 | BMA/GMA, 97/3 | 0.37 | NH₃ | 0.3 | do ² | 225-250 | do ³ | 50/50/15 |
| 35 | MMA/BMA/GMA, 30/64/4 | 0.34 | NH₃ | 0.4 | do ² | 225-250 | do ³ | 75/25/7.5 |
| 36 | MMA/BMA/GMA, 30/64/4 | 0.34 | NH₃ | 0.4 | do ² | 225-250 | do ³ | 50/50/15 |

*Table II*—Continued

ADHESIVE PREPARATION—Continued

| Examples | (A) Aminoester Modified Vinyl Polymer | | | | (B) Epoxy Resin | | (C) Curing Agent | Adhesive Composition A/B/C |
|---|---|---|---|---|---|---|---|---|
| | Composition of Preformed Polymer [1] Parts by wt. | Inherent Viscosity | Aminating Reagent | Percent N (Amino) | Type | Epoxide Equiv. | Curing Agent | |
| 37 | BMA/MMA/GMA, 64/32.5/3.5. | 0.44 | n-Octyl amine | 0.35 | do [2] | 225–250 | do [3] | 50/50/15 |
| 38 | BMA/GMA, 97/3 | 0.06 | NH₃ | 0.33 | do [2] | 225–250 | do [3] | 25/75/22.5 |
| Control-A | MMA/GMA, 97/3 | 0.42 | Diethylamine | 0.46 | do [2] | 225–250 | do [3] | 50/50/15 |
| Control-B | MMA/GMA, 97/3 | 0.42 | t-Butylamine | 0.48 | do [2] | 225–250 | do [3] | 50/50/15 |

[1] The monomers are abbreviated as follows:
BMA = n-butyl methacrylate.
MMA = methyl methacrylate.
GMA = glycidyl methacrylate.
HMA = n-hexyl methacrylate.
EMA = ethyl methacrylate.
t-BA = t-butyl acrylate.
S = styrene.
EA = ethyl acrylate.
AN = acrylonitrile.

[2] "Epon" 834 is an epoxy resin derived from Bisphenol A and epichlorohydrin and produced by the Shell Chemical Corporation.

[3] "Epon" U is an addition product of diethylene triamine and the glycidyl ether of Bisphenol A (epoxy eq.=180–195) in the ratio of 2/1 produced by the Shell Chemical Corporation.

*Table IIa*

TEST RESULTS

| Examples | "Green Adhesion" | | Boiling Water Immersion, Days |
|---|---|---|---|
| | Tack [1] (gm./in.²) | Peel (gm./in.) | |
| 24 | 4,500+ | 710 | 8+ |
| 25 | 4,200+ | 620 | 10 |
| 26 | 4,300 | 580 | 14 |
| 27 | 4,200 | 680 | 14 |
| 28 | 3,820 | 715 | 7 |
| 29 | 4,410+ | 510 | 10 |
| 30 | 3,970 | 630 | 11 |
| 31 | 4,140+ | 520 | 7+ |
| 32 | 1,620 | 360 | 7+ |
| 33 | 3,000+ | 610 | 7+ |
| 34 | 4,500+ | 620 | 7+ |
| 35 | 4,500+ | 620 | 21+ |
| 36 | 4,500+ | 580 | 31+ |
| 37 | 4,200 | 580 | 7+ |
| 38 | 3,600 | 450 | 7+ |
| Control-A | 3,280 | 420 | 1 hr. |
| Control-B | 3,850 | 475 | 1 hr. |

[1] The + value indicates that the tack value exceeds the strength of the two-side tape used to hold laminate sample in Suter tester.

What is claimed is:

1. An adhesive composition comprising: an organic solvent solution of (a) a vinyl polymer having attached to the carbon-carbon chain monovalent radicals of the formula:

$$-\overset{O}{\underset{\|}{C}}-O-Z-N\overset{H}{\underset{R''}{\diagdown}}\diagup^{R}_{R'}$$

wherein:
Z is an aliphatic hydrocarbon radical of 2 to 3 carbon atoms;
R is selected from the group consisting of hydrogen and alkyl radicals of from 1 to 8 carbon atoms;
R' is selected from the group consisting of hydrogen, hydroxyl radicals and alkyl radicals of from 1 to 8 carbon atoms; and
R'' is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said polymer being at least 0.010% based on the weight of said vinyl polymer and (b) a polyglycidyl ether of a dihydric phenolic compound having an epoxide equivalent within the range of about 100 to 3000, said components (a) and (b) being present in a weight ratio of from about 1:99 to 99:1.

2. The adhesive composition of claim 1 wherein there is additionally present about 0.5 to 30%, based on the combined weight of components (a) and (b), of (c) an amine curing agent.

3. The adhesive composition of claim 1 wherein the vinyl polymer is an acrylic ester polymer having an amino nitrogen content within the range of about 0.1 to 8.0%.

4. An adhesive composition comprising: an organic solvent solution of (a) an acrylic ester polymer having attached to the carbon-carbon chain monovalent radicals of the formula:

$$-\overset{O}{\underset{\|}{C}}-O-Z-N\overset{H}{\underset{R''}{\diagdown}}\diagup^{R}_{R'}$$

wherein:
Z is an aliphatic hydrocarbon radical of 2 to 3 carbon atoms;
R is selected from the group consisting of hydrogen and alkyl radicals of from 1 to 8 carbon atoms;
R' is selected from the group consisting of hydrogen, hydroxyl radicals and alkyl radicals of from 1 to 8 carbon atoms and
R'' is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said acrylic ester polymer being within the range of about 0.1 to 8.0%, based on the weight of said polymer, (b) a diphenylolpropane diglycidyl ether having an epoxide equivalent within the range of about 100 to 1000, and (c) 0.5 to 30% by weight of a polyamine curing agent, said components (a) and (b) being present in a weight ratio of from about 97:3 to 25:75.

5. An adhesive composition comprising: an organic solvent solution of (a) a vinyl addition polymer of methacrylic acid with at least one other vinyl monomer having attached to the carbon-carbon chain monovalent radicals of:

(1)
$$-\overset{O}{\underset{\|}{C}}-O-CH_2-CH_2-NH_2$$

the amino nitrogen content of said polymer being within the range of about 0.1 to 8.0%, based on the weight of said polymer; (b) an epoxy resin derived from epichlorohydrin and 2,2-bis(4-hydroxyphenyl)propane having an epoxide equivalent within the range of about 100 to 1000 and (c) about 2.5 to 15% by weight of a polyalkyleneamine curing agent, said components (a) and (b) being present in a weight ratio of from about 97:3 to 25:75.

6. The adhesive composition of claim 5 wherein the vinyl addition polymer is a copolymer of methacrylic acid and methyl methacrylate.

7. The adhesive composition of claim 5 wherein the vinyl addition polymer is a copolymer of methacrylic acid, methyl methacrylate and butyl methacrylate.

8. An adhesive composition comprising: an organic solvent solution of (a) a vinyl addition polymer of glycidyl methacrylate with at least one other vinyl monomer having attached to the carbon-carbon chain monovalent radicals of:

(1)
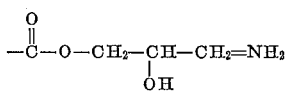

the amino nitrogen content of said polymer being within the range of about 0.1 to 8.0%, based on the weight of said polymer; (b) an epoxy resin derived from epichlorohydrin and 2,2-bis(4-hydroxyphenyl)propane having an epoxide equivalent within the range of about 100 to 1000 and (c) about 7.5 to 22.5% by weight of a polyalkyleneamine curing agent, said components (a) and (b) being present in a weight ratio of from about 75:25 to 25:75.

9. The adhesive composition of claim 8 wherein the vinyl addition polymer is a copolymer of glycidyl methacrylate, methyl methacrylate and butyl methacrylate.

10. A laminated structure comprising: a substrate, a preformed layer of polyvinyl fluoride film at least one surface of which has been chemically activated and, between said substrate and said activated surface, a layer of an adhesive comprising (a) a vinyl polymer having attached to the carbon-carbon chain monovalent radicals of the formula:

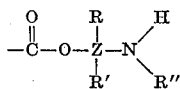

wherein:
Z is an aliphatic hydrocarbon radical of 2 to 3 carbon atoms;
R is selected from the group consisting of hydrogen and alkyl radicals of from 1 to 8 carbon atoms;
R' is selected from the group consisting of hydrogen, hydroxyl radicals and alkyl radicals of from 1 to 8 carbon atoms and
R" is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said polymer being at least 0.01%, based on the weight of said vinyl polymer and (b) a polyglycidyl ether of a dihydric phenolic compound having an epoxide equivalent within the range of about 100 to 3000, said components (a) and (b) being present in a weight ratio of from about 1:99 to 99:1.

11. The laminated structure of claim 10 wherein the substrate is a metallic substrate.

12. The laminated structure of claim 10 wherein the substrate is a cellulosic substrate.

13. The laminated structure of claim 10 wherein the substrate is a cementitious substrate.

14. A laminated structure comprising: a substrate, a preformed layer of polyvinyl fluoride film at least one surface of which has been chemically activated and, between said substrate and said activated surface, a layer of an adhesive comprising (a) an acrylic ester polymer having attached to the carbon-carbon chain monovalent radicals of the formula:

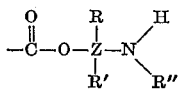

wherein:
Z is an aliphatic hydrocarbon radical of 2 to 3 carbon atoms;
R is elected from the group consisting of hydrogen and alkyl radicals of from 1 to 8 carbon atoms;
R' is selected from the group consisting of hydrogen, hydroxyl radicals and alkyl radicals of from 1 to 8 carbon atoms and
R" is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said acrylic ester polymer being within the range of about 0.1 to 8.0%, based on the weight of said polymer, (b) a diphenylolpropane diglycidyl ether having an epoxide equivalent within the range of about 100 to 1000, and (c) 0.5 to 30% by weight of a polyamine curing agent, said components (a) and (b) being present in a weight ratio of from about 97:3 to 25:75.

15. A laminated structure comprising: at least two substrates and, between said substrates, a layer of an adhesive composition comprising (a) a vinyl polymer having attached to the carbon-carbon chain monovalent radicals of the formula:

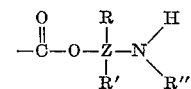

wherein:
Z is an aliphatic hydrocarbon radical of 2 to 3 carbon atoms;
R is selected from the group consisting of hydrogen and alkyl radicals of from 1 to 8 carbon atoms;
R' is selected from the group consisting of hydrogen, hydroxyl radicals and alkyl radicals of from 1 to 8 carbon atoms and
R" is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said polymer being at least 0.01%, based on the weight of said vinyl polymer and (b) a polyglycidyl ether of a dihydric phenolic compound having an epoxide equivalent within the range of about 100 to 3000, said components (a) and (b) being present in a weight ratio of from about 1:99 to 99:1.

16. An adhesive composition comprising: an organic solvent solution of (a) a vinyl addition polymer of methacrylic acid and at least one other vinyl monomer having attached to the carbon-carbon chain monovalent radicals of:

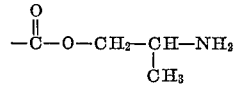

the amino nitrogen content of said polymer being within the range of about 0.1 to 8.0%, based on the weight of said polymer; (b) an epoxy resin derived from epichlorohydrin and 2,2-bis(4-hydroxyphenyl)propane having an epoxide equivalent within the range of about 100 to 1000 and (c) about 2.5 to 15% by weight of a polyalkyleneamine curing agent, said components (a) and (b) being present in a weight ratio of from about 97:3 to 25:75.

17. An adhesive composition comprising: an organic solvent solution of (a) a vinyl addition polymer of methacrylic acid and at least one other vinyl monomer having attached to the carbon-carbon chain monovalent radicals of:

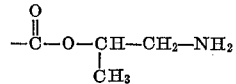

the amino nitrogen content of said polymer being within the range of about 0.1 to 8.0%, based on the weight of said polymer; (b) an epoxy resin derived from epichlorohydrin and 2,2-bis(4-hydroxyphenyl)propane having an epoxide equivalent within the range of about 100 to 1000 and (c) about 2.5 to 15% by weight of a polyalkyleneamine curing agent, said components (a) and (b) being present in a weight ratio of from about 97:3 to 25:75.

18. An adhesive composition comprising: an organic solvent solution of (a) a vinyl addition polymer of glycidyl methacrylate and at least one other vinyl monomer having attached to the carbon-carbon chain monovalent radicals of:

$$-\overset{O}{\underset{\|}{C}}-O-CH_2-\underset{\underset{NH_2}{|}}{CH}-CH_2OH$$

the amino nitrogen content of said polymer being within the range of about 0.1 to 8.0%, based on the weight of said polymer; (b) an epoxy resin derived from epichlorohydrin and 2,2-bis(4-hydroxyphenyl)propane having an epoxide equivalent within the range of about 100 to 1000 and (c) about 7.5 to 22.5% by weight of a polyalkyleneamine curing agent, said components (a) and (b) being present in a weight ratio of from about 75:25 to 25:75.

19. The composition of claim 1 additionally containing a corrosion inhibitor.

20. The composition of claim 1 additionally containing an ultra-violet light absorber.

21. The composition of claim 1 additionally containing calcium molybdate.

22. The composition of claim 4 additionally containing a corrosion inhibitor.

23. The composition of claim 4 additionally containing calcium molybdate.

24. The process comprising: coating a surface of a preformed layer of polyvinyl fluoride film, said surface having been chemically activated, with the composition of claim 1; drying said coated film; and applying the coated surface of said film to a substrate with heat and pressure.

25. The process comprising: coating a surface of a preformed layer of polyvinyl fluoride film, said surface having been chemically activated, with the composition of claim 4; drying said coating film; and applying the coated surface of said film to a substrate with heat and pressure.

26. A structure comprising: a preformed layer of polyvinyl fluoride film having one surface chemically activated and a coating on said surface of (a) a vinyl polymer having attached to the carbon-carbon chain monovalent radicals of the formula:

$$-\overset{O}{\underset{\|}{C}}-O-\underset{\underset{R'}{|}}{Z}-\overset{H}{\underset{}{N}}-R-''$$

wherein:
Z is an aliphatic hydrocarbon radical of 2 to 3 carbon atoms;
R is selected from the group consisting of hydrogen and alkyl radicals of from 1 to 8 carbon atoms;
R' is selected from the group consisting of hydrogen, hydroxyl radicals and alkyl radicals of from 1 to 8 carbon atoms; and
R'' is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said polymer being at least 0.010% based on the weight of said vinyl polymer and (b) a polyglycidyl ether of a dihydric phenolic compound having an epoxide equivalent within the range of about 100 to 3000, said components (a) and (b) being present in a weight ratio of from about 1:99 to 99:1.

27. A structure comprising: a preformed layer of polyvinyl fluoride film having one surface chemically activated and a coating on said surface of (a) an acrylic ester polymer having attached to the carbon-carbon chain monovalent radicals of the formula:

$$-\overset{O}{\underset{\|}{C}}-O-\underset{\underset{R'}{|}}{Z}-N\overset{H}{\underset{R''}{\diagdown}}$$

wherein:
Z is an aliphatic hydrocarbon radical of 2 to 3 carbon atoms;
R is selected from the group consisting of hydrogen and alkyl radicals of from 1 to 8 carbon atoms;
R' is selected from the group consisting of hydrogen, hydroxyl radicals and alkyl radicals of from 1 to 8 carbon atoms; and
R'' is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said acrylic ester polymer being within the range of about 0.1 to 8.0%, based on the weight of said polymer, (b) a diphenylolpropane diglycidyl ether having an epoxide equivalent within the range of about 100 to 1000, and (c) 0.5 to 30% by weight of a polyamine curing agent, said components (a) and (b) being present in a weight ratio of from about 97:3 to 25:75.

28. A polymeric composition comprising: (a) a vinyl polymer having attached to the carbon-carbon chain monovalent radicals of the formula:

$$-\overset{O}{\underset{\|}{C}}-O-\underset{\underset{R'}{|}}{Z}-N\overset{H}{\underset{R''}{\diagdown}}$$

wherein:
Z is an aliphatic hydrocarbon radical of 2 to 3 carbon atoms;
R is selected from the group consisting of hydrogen and alkyl radicals of from 1 to 8 carbon atoms;
R' is selected from the group consisting of hydrogen, hydroxyl radicals and alkyl radicals of from 1 to 8 carbon atoms and
R'' is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said polymer being at least 0.010% based on the weight of said vinyl polymer and (b) a polyglycidyl ether of a dihydric phenolic compound having an epoxide equivalent within the range of about 100 to 3000, said components (a) and (b) being present in a weight ratio of from about 1:99 to 99:1.

29. A polymeric composition comprising: (a) an acrylic ester polymer having attached to the carbon-carbon chain monovalent radicals of the formula:

$$-\overset{O}{\underset{\|}{C}}-O-\underset{\underset{R'}{|}}{Z}-N\overset{H}{\underset{R''}{\diagdown}}$$

wherein:
Z is an aliphatic hydrocarbon radical of 2 to 3 carbon atoms;
R is selected from the group consisting of hydrogen and alkyl radicals of from 1 to 8 carbon atoms;
R' is selected from the group consisting of hydrogen, hydroxyl radicals and alkyl radicals of from 1 to 8 carbon atoms; and
R'' is selected from the group consisting of hydrogen, non-tertiary alkyl radicals of from 1 to 8 carbon atoms and omega-hydroxy substituted non-tertiary alkyl radicals of from 1 to 8 carbon atoms;
the amino nitrogen content of said acrylic ester polymer being within the range of about 0.1 to 8.0%, based on the weight of said polymer, (b) a diphenylolpropane diglycidyl ether having an epoxide equivalent within the range of about 100 to 1000, and (c) 0.5 to 30% by weight of a polyamine curing agent, said components (a) and (b) being present in a weight ratio of from about 97:3 to 25:75.

30. The polymeric composition of claim 29 additionally containing calcium molybdate.

31. The composition of claim 2 additionally containing an aliphatic polyamide resin.

32. The composition of claim 4 additionally containing an aliphatic polyamide resin.

References Cited by the Examiner
UNITED STATES PATENTS

| | | | |
|---|---|---|---|
| 2,776,951 | 1/1957 | Melamed | 260—45.5 |
| 3,133,854 | 5/1964 | Simms | 161—219 X |

EARL M. BERGERT, *Primary Examiner.*